2 Sheets—Sheet 1.

F. & J. HAINSWORTH.
EXERCISING-MACHINE.

No. 183,296. Patented Oct. 17, 1876.

WITNESSES:
N. H. Sherburne,
J. E. Morrison

INVENTORS:
Frederick Hainsworth
Jonathan Hainsworth
By Gridley & Sherburne
Attys 2 Sheets—Sheet 2.

F. & J. HAINSWORTH.
EXERCISING-MACHINE.

No. 183,296.  Patented Oct. 17, 1876.

WITNESSES:
N. H. Sherburne
J. E. Morrison

INVENTORS:
Frederick Hainsworth,
Jonathan Hainsworth
By Gridley & Sherburne
Attys

UNITED STATES PATENT OFFICE.

FREDERICK HAINSWORTH AND JONATHAN HAINSWORTH, OF CHICAGO, ILL.

IMPROVEMENT IN EXERCISING-MACHINES.

Specification forming part of Letters Patent No. 183,296, dated October 17, 1876; application filed March 11, 1876.

*To all whom it may concern:*

Be it known that we, FREDERICK HAINSWORTH and JONATHAN HAINSWORTH, of Chicago, in the county of Cook and State of Illinois, have invented certain new and useful Improvements in Exercising-Machines or "Health-Lifts;" and we do hereby declare the following to be a full, clear, and exact description thereof, which will enable others skilled in the art to which our invention appertains to make and use the same, reference being had to the accompanying drawing, forming part of this specification, in which—

Figure 1:
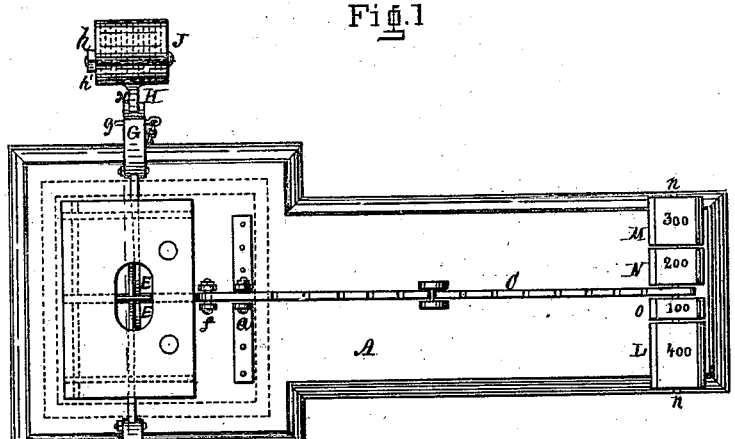
Figure 2:
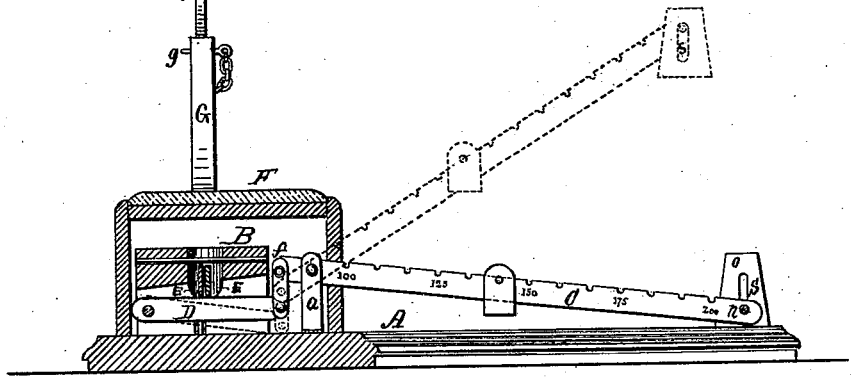
Figure 3:
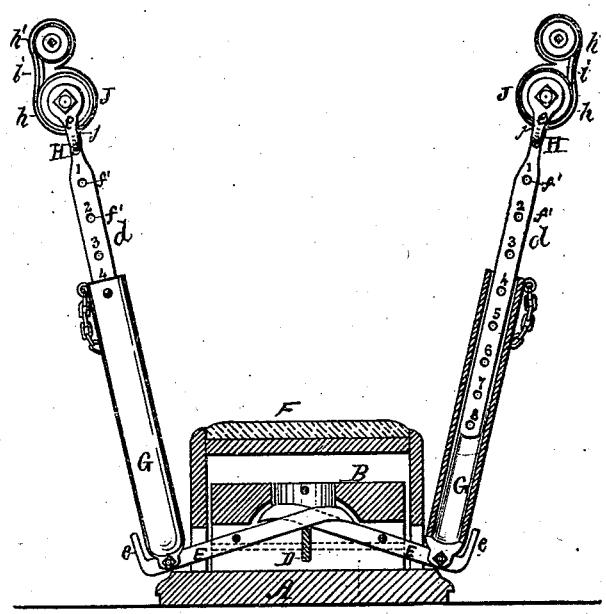
Figure 4:
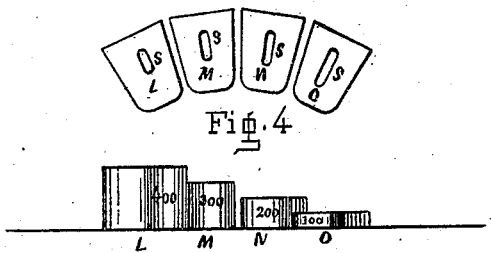

Figure 1 represents a general plan or top view of an exercising-machine or health-lift embodying our invention. Fig. 2 represents a longitudinal sectional elevation of the same. Fig. 3 represents a transverse sectional elevation, taken on the line $x$ $x$ drawn across Fig. 1; and Fig. 4 represents the weights employed, detached from the lifting-beam.

Like letters of reference indicate like parts.

The object of our invention is to simplify the construction and improve the operation of exercising-machines or health-lifts now in use; and to that end our invention consists in the several combinations of parts, as will be more fully understood from the following description and claims.

In the drawing, A represents the base of the machine, made of any suitable material, preferably of wood, and in the form shown or in any other suitable form that will receive the operating parts. B is a wood or metal frame, permanently attached to the base A at a point near its rear end, and adapted to receive and support the operating-levers. C is the lifting-beam, fulcrumed at a point near its rear end to a vertical upright, $a$, which is secured to the base A, slightly forward of the frame. D is a lever fulcrumed at its rear end to the frame B near its center laterally, and extending forward through the frame to a point immediately under the rear end of the lifting-beam, and is connected therewith by a connecting-link, $f$, as shown in Fig. 2. E E are the lifting-levers, fulcrumed at a point near their centers to the frame, as shown in Fig. 3. The inner end of each of said levers passes over, and rests upon, the lever D at a point near its center, and the outer end of each extends slightly beyond the vertical plane of the edge of the base. F is the platform upon which the operator stands during the act of lifting. This platform is loosely fitted over the frame B, and is provided at its sides and end with slots, through which the lifting-levers and beam loosely pass. G G are the lifting-bars, which are made hollow, and hinged at their lower ends to the outer ends of the lifting-levers, as shown in Fig. 3. The outer end of each of said lifting-levers is bent upward, forming an upright, $e$, against which the lifting-bars rest when not acted upon, the object being to hold the bars in an upright position.

H H are the handles, each of which is provided with a depending shank, $d$, adapted to pass loosely into the cavity of the lifting-bars. The shanks $d$ are each provided with a series of perforations, $f'$, formed through them at graduated distances, and adapted to receive an adjusting-pin, $g$, passing through a suitable opening formed in the upper end of the bars, by which means the handles can be elevated or depressed to suit the height of the person lifting with them. J J are the grasping-pieces of the handles, and are made of sheet metal formed so as to present two cylindrical parts, $h$ $h'$, of unequal diameter, connected by a web, $i$, as shown in Fig. 3. The ends of each of the parts $h$ $h'$ of the grasping-pieces are provided with notches $j$, adapted to receive the side pieces $c$ $c$ of the handles, which are connected by a bolt passing through them, so as to prevent them from rocking forward when force is applied to them.

By making the grasping-pieces in the form specified, the upper part forms a support to the palm of the hand during the act of lifting, and by connecting them to the handle by the bolt passing through them, they can be readily reversed so as to bring the part $h$ downward when desired, the part $h$ being adapted to fit the hands of children, and enabling them to lift therewith without cramping the fingers.

The forward end of the lifting-beam C is provided with arms $n$ $n$ projecting outward laterally therefrom, and adapted to receive the weights L, M, N, and O to be lifted. The weights are made of different sizes, and each of them is provided, centrally, with an elongated slot, S, through which the arms $n$ loosely pass, the length of the slot increasing in said weights, respectively, as they decrease in size, the object being to allow the larger weight to be lifted off the base before the arm is made to act upon the next smaller in size, when more than one weight is used.

The operation of our health-lift is as follows: The weight, designating the amount desired to be lifted, is placed upon the arm at the end of the beam. The operator then mounts the platform, and adjusts the handles at such a height that, when grasping them for the purpose of lifting, his body will be in nearly an erect position, and his legs bent slightly at the knees. The lift is then made, which causes the ends of the lifting-levers E to bear upon the lever D, forcing it downward, and transmitting the force applied to the short arm of the lifting-beam, moving it downward, and thereby elevating its opposite end with the weight thereon.

Having thus described our invention, what we claim as new, and desire to secure by Letters Patent, is—

1. In an exercising-machine or health-lift, the combination, with the handles and lifting-beam C, of the lever D and lifting-levers E E, substantially as specified.

2. In combination with the lifting-beam C and the arms n, the series of weights provided with slots S, the lengths of said slots being proportioned inversely to the weights, substantially as and for the purpose specified.

3. In combination with the handles H H, the reversible grasping-pieces J J, consisting of the cylindrical parts $h\ h'$, of unequal diameters, united by the web $i$, substantially as and for the purpose specified.

FREDERICK HAINSWORTH.
JONATHAN HAINSWORTH.

Witnesses:
N. C. GRIDLEY,
N. H. SHERBURNE.